United States Patent
Gstach et al.

(10) Patent No.: US 10,519,998 B2
(45) Date of Patent: Dec. 31, 2019

(54) EXPANSION ANCHOR HAVING A DOUBLE COATING

(71) Applicant: Hilti Aktiengesellschaft, Schaan (LI)

(72) Inventors: Peter Gstach, Schaan (LI); Michael Beckert, Diepoldsau (CH); Bernhard Winkler, Feldkirch (AT); Patrick Scholz, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 204 days.

(21) Appl. No.: 15/735,448

(22) PCT Filed: Jun. 7, 2016

(86) PCT No.: PCT/EP2016/062851
§ 371 (c)(1),
(2) Date: Dec. 11, 2017

(87) PCT Pub. No.: WO2016/198378
PCT Pub. Date: Dec. 15, 2016

(65) Prior Publication Data
US 2018/0180081 A1    Jun. 28, 2018

(30) Foreign Application Priority Data
Jun. 11, 2015   (EP) .................................... 15171632

(51) Int. Cl.
  *F16B 13/06*   (2006.01)
  *F16B 2/00*    (2006.01)
(52) U.S. Cl.
  CPC ............ *F16B 13/065* (2013.01); *F16B 2/005* (2013.01); *F16B 13/063* (2013.01); *F16B 13/066* (2013.01)

(58) Field of Classification Search
  CPC ..... F16B 13/065; F16B 13/066; F16B 13/063
  (Continued)

(56) References Cited

U.S. PATENT DOCUMENTS 5,076,733 A * 12/1991 Frease .................. F16B 13/066
                                                                405/259.1
5,160,226 A * 11/1992 Lee, II .................... F16L 55/13
                                                                411/45

(Continued)

FOREIGN PATENT DOCUMENTS

| DE | 4225869 A1 | 2/1994 |
|----|------------|--------|
| EP | 0514342 A1 | 11/1992 |
| JP | 2009527623 | 7/2009 |

OTHER PUBLICATIONS

Search Report of PCT/EP2016/062851, dated Jul. 19, 2016, 2 pages.

*Primary Examiner* — Gary W Estremsky
(74) *Attorney, Agent, or Firm* — Davidson, Davidson & Kappel, LLC

(57) ABSTRACT

An expansion anchor, including at least one anchor body as a first element and at least one bolt as a second element, wherein the bolt has an expansion body, which pushes the anchor body radially outward when the expansion body is moved in an extraction direction in relation to the anchor body is provided. A double coating having an inner layer and an outer layer covering the inner layer is provided on one of the two elements in an area of contact with the other element, wherein the outer layer has a coefficient of friction with respect to the other element that is greater than a coefficient of friction of the inner layer with respect to the other element.

7 Claims, 1 Drawing Sheet

(58) Field of Classification Search
USPC ... 411/60.1, 14.5, 18, 32–34, 44–46, 49, 50, 411/54, 70
See application file for complete search history.

(56) References Cited

U.S. PATENT DOCUMENTS

| | | | |
|---|---|---|---|
| 5,176,481 A | | 1/1993 | Schiefer |
| 5,211,512 A | * | 5/1993 | Frischmann .......... F16B 13/065 405/259.4 |
| 5,419,664 A | * | 5/1995 | Hengesbach ......... F16B 13/065 411/61 |
| 5,603,592 A | * | 2/1997 | Sadri .................. F16B 19/1054 411/34 |
| 6,247,883 B1 | * | 6/2001 | Monserratt ........... F16B 13/045 411/34 |
| 7,842,403 B2 | | 11/2010 | Meyer, Jr. et al. |
| 7,976,258 B2 | * | 7/2011 | Asai ...................... C23C 28/023 411/424 |
| 2003/0108399 A1 | * | 6/2003 | Heinzelmann ...... F16B 13/0858 411/61 |
| 2008/0050195 A1 | | 2/2008 | Wieser et al. |
| 2009/0285654 A1 | * | 11/2009 | Stecher .................... F16B 2/04 411/426 |
| 2009/0290953 A1 | | 11/2009 | Asai et al. |
| 2010/0104393 A1 | * | 4/2010 | Kobetsky ............. F16B 13/065 411/55 |

\* cited by examiner

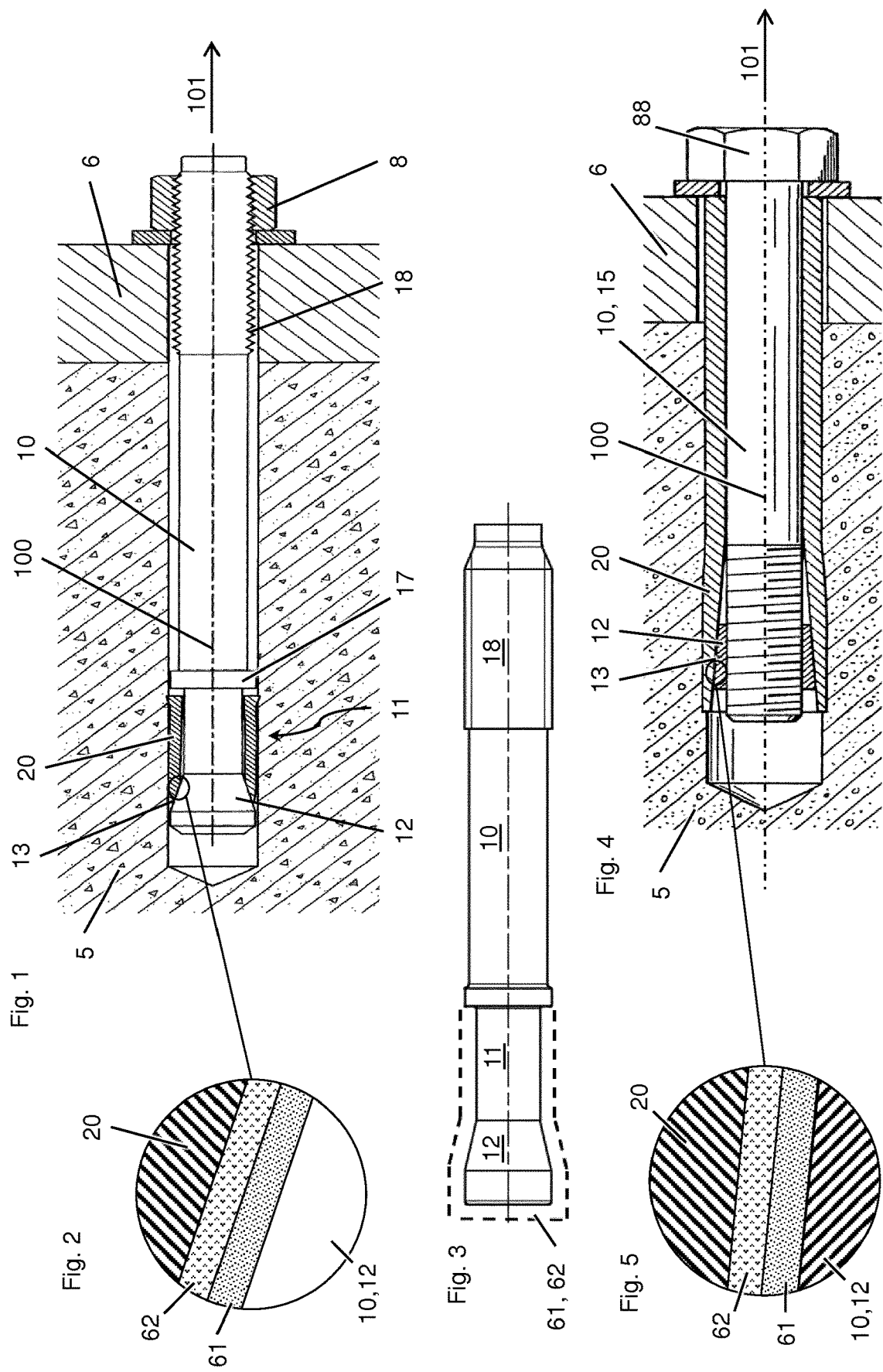

EXPANSION ANCHOR HAVING A DOUBLE COATING

The present invention relates to an expansion anchor that includes at least one anchor body, preferably an expansion sleeve, as a first element and at least one bolt as a second element, the bolt including an expansion body, preferably an expansion cone, that pushes the anchor body radially outwardly when the expansion body is moved in an extraction direction relative to the anchor body.

BACKGROUND

Expansion anchors are known from EP 0514342 A1, for example. They are inserted into a borehole in a substrate of a component, for example in a wall or a ceiling. By retracting an expansion cone, which has an inclined surface and which is provided on the bolt, into a anchor body designed as an expansion sleeve, this anchor body is radially expanded and pushed outwardly, thus anchoring the expansion anchor in the substrate. According to EP 0514342 A1, a friction-reducing coating is provided at the contact area between the expansion cone and the anchor body.

US 2008/0050195 A describes an expansion anchor in which the surface roughness of the expansion sleeve increases toward the rear end of the expansion anchor.

DE 4225869 A1 describes a anchor made of stainless steel, in which the anchor body is spread apart by tightening a screw or a nut, or by forcing into place an expansion body, and during the spreading operation two surfaces move toward one another with increasing compression, these surfaces subjected to the compression being provided with a coating that counteracts blocking, and for one of the surfaces subjected to the compression the coating being formed by galvanizing or nitriding, and an additional layer of lubricating lacquer, wax, or grease optionally being applied.

US 2009/0290953 A describes a screw with a double coating that includes an outer layer that may be rubbed off.

SUMMARY OF THE INVENTION

It is an object of the present invention to provide an expansion anchor which is particularly effective and versatile, and which at the same time is also particularly reliable and easy to manufacture.

An expansion anchor according to the present invention is characterized in that a double coating having an inner layer and an outer layer covering the inner layer is provided on one of the two elements in an area of contact with the other element, the outer layer having a coefficient of friction $\mu_2$ with respect to the other element that is greater than a coefficient of friction $\mu_1$ of the inner layer with respect to the other element.

A basic concept of the present invention may be regarded as providing, in the expansion area of an expansion anchor that spreads in a force-controlled manner, a multiple coating having different coefficients of friction, so that $\mu_2 > \mu_1$.

The present invention takes into account the finding that in the design of expansion anchors, the situation may arise in which, although a change in the configuration of the expansion anchor results in an improvement in the anchoring behavior at one location, this is accompanied by disadvantages at some other location. Thus, for example, on the one hand it may be desirable to provide a high coefficient of friction between the expansion body and the anchor body in order to avoid the expansion body being pulled through the anchor body, i.e., in particular through the expansion sleeve, and thus to avoid premature failure of the expansion anchor under excessive static tensile loads. On the other hand, a high coefficient of friction may be disadvantageous with regard to dynamic cracks in cracked concrete, in particular in the event of earthquakes. Namely, if the coefficient of friction between the expansion body and the expansion sleeve is large, the expansion body will in fact be retracted further into the expansion sleeve when the crack in which the expansion anchor is situated widens. However, for a large coefficient of friction, the converse operation does not occur when the crack subsequently closes once again, and the expansion body remains deep in the expansion sleeve, which may result in damage to the surrounding concrete. Thus, for cracked concrete a low coefficient of friction may be advantageous in order to ensure that the expansion body slides back and forth in the expansion sleeve when the crack opens and subsequently closes.

When designing a conventional expansion anchor, it has therefore been necessary to decide whether to select a low coefficient of friction between the anchor body and the expansion body with regard to good properties in cracked concrete with moving cracks, which, however, is associated with a lower extraction load, or whether to select a high coefficient of friction, which does result in high static extraction loads but also results in poorer properties in cracked concrete and/or in dynamic situations.

The present invention addresses this problem by providing a double coating, made up of an inner layer and an outer layer, on one of the two elements (the anchor body or the bolt) in the area of contact with the respective other element, i.e., where the two elements are in contact with one another and rub against one another. The double coating is designed in such a way that the outer layer has a high level of friction with the adjoining other element, and the inner layer has a lower level of friction with the adjoining other element. In this configuration, in the static case the outer layer may act and generate high static load values. In contrast, in dynamic, in particular seismic, situations, the outer layer may be worn off due to the repeated frictional movement between the anchor body and the expansion body, so that from this point on, the low-friction inner layer acts, which allows the expansion body to effectively move back and forth, thus preventing damage to the substrate. The dilemma described above, in which one coefficient of friction or the other is advantageous, depending on the application, may thus be solved, and on the one hand particularly good static performance is obtained in the event of tensile loads in uncracked and cracked concrete, and on the other hand particularly good static performance in the dynamic or seismic case and/or particularly high robustness in the event of an opening and closing crack are/is also obtained.

The outer layer covers the inner layer toward the outside; i.e., the inner layer is situated between the outer layer and the one element having the double coating. For example, the inner layer may be situated directly on the one element. However, one or multiple intermediate layers, for example a corrosion protection layer, may also be provided between the inner layer and the one element. The coefficient of friction may change abruptly between the two layers, or may make a steady transition between the two layers. The two elements rest against one another in the contact area, resulting in friction between the two elements at that location.

In conjunction with the present invention, with regard to the underlying physical effects, the coefficients of friction may be understood in particular to mean the coefficients of friction for static friction. However, since sliding friction is generally closely associated with static friction, as an alternative, for example for the sake of better measurability, in principle the particular coefficients of friction may also represent sliding friction.

The anchor body and/or the bolt, in particular its expansion body, are/is preferably made of a metal material. The double coating is provided on one of the two elements, i.e., either on the anchor body or on the bolt, in particular on its expansion body; i.e., one of the two elements is coated with the double coating. In particular, the double coating is integrally joined to one of the two elements.

According to the present invention, the anchor body is situated on, in particular fastened to, the bolt so that the anchor body is movable along the bolt. When reference is made to "radial" and "axial," this is intended to refer in particular to the longitudinal axis of the bolt and/or of the expansion anchor, which in particular may be the axis of symmetry and/or center axis of the bolt or the expansion anchor. The expansion anchor may in particular be an expansion anchor that spreads in a force-controlled manner.

According to the present invention, the anchor body is pushed radially outwardly by the expansion body, and in the process is pressed against the borehole wall in the substrate when the expansion body is axially displaced relative to the anchor body in the extraction direction of the bolt. During this operation, which is effectuated in particular by an inclined surface that is provided on the expansion body, and in which the anchor body, which is preferably designed as an expansion sleeve, may also be widened, the expansion anchor is anchored in the borehole. The extraction direction preferably extends in parallel to the longitudinal axis of the bolt, and/or points out of the borehole. In particular, on the expansion body the distance of the surface of the expansion body from the longitudinal axis of the bolt increases in the direction opposite the extraction direction.

According to the present invention, the double coating is provided at least in a contact area between the two elements, i.e., in particular in an area in which the anchor body rests against the expansion body in such a way that the expansion body may act against the anchor body and may push it radially outwardly. The double coating may also extend across the contact area, which may have manufacturing advantages.

It is particularly advantageous that the coefficient of friction of the outer layer with respect to the other element is at least 20%, 50%, or 100% greater than the coefficient of friction of the inner layer with respect to the other element; i.e., $\mu_2 > 1.2 \times \mu_2 > 1.5 \times \mu_1$ or $\mu_2 > 2 \times \mu_1$. The above-described effect is particularly apparent due to the significant difference between the two coefficients of friction.

In one preferred refinement of the present invention, the double coating is provided on the bolt, in particular at least on the expansion body. Accordingly, one of the two elements is the bolt and the other element is the anchor body, preferably the expansion sleeve, and in particular the double coating is integrally joined at least to the expansion body. This may be advantageous with regard to the level of manufacturing effort and the reliability. The contact area is preferably formed at least on the expansion body.

It is particularly advantageous that the anchor body is an expansion sleeve that encloses the bolt at least in areas, and/or that the expansion body is an expansion cone. A particularly uniform transmission of force in the circumferential direction is achieved in this way. The angular extension of the expansion sleeve about the longitudinal axis of the bolt is preferably at least 270°, in particular at least 315° or 340°. According to this specific embodiment, it may be ensured in a particularly simple manner that the bolt does not rub directly against the borehole, but, rather, at least for the most part rubs only indirectly via the expansion sleeve. According to the present invention, the expansion cone is provided for spreading apart the expansion sleeve, i.e., for radially expanding the expansion sleeve. One anchor body or also multiple anchor bodies and a corresponding number of expansion bodies may be provided. The expansion cone may have a strict mathematical conical surface, but does not have to have such.

According to the present invention, the bolt may include a load absorbing device which may be designed in particular as an external thread, as an internal thread, or as a head. The load absorbing device is used for transmitting tensile forces that are directed into the expansion anchor in the extraction direction. The expansion body is advantageously situated in a first end area of the bolt, and the load absorbing device is situated in an opposite second end area of the bolt. In particular, the direction vector may be directed in the extraction direction from the expansion body to the load absorbing device. The distance of the surface of the expansion body from the longitudinal axis of the bolt preferably increases with increasing distance from the load absorbing device.

The expansion anchor is preferably an expansion anchor of the bolt type. In such an expansion anchor, the expansion body is retracted into the anchor body during setting of the anchor by an axial movement of the bolt relative to the anchor body. In the bolt type of expansion anchor, the bolt preferably has a one-piece design, and in particular the expansion body has a one-piece design with adjoining bolt areas. A stop, for example a ring shoulder, that limits displacement of the anchor body away from the expansion body may preferably be formed on the bolt.

Alternatively, the expansion anchor may be an expansion anchor of the sleeve type. In the sleeve type of expansion anchor, the bolt includes an anchor rod that is separate from the expansion body, the expansion body preferably being connected to the anchor rod via corresponding threads. The retraction of the expansion body during setting of the anchor in the anchor body may then preferably be effectuated, at least in part, by rotating the anchor rod relative to the expansion body; this rotation is converted into an axial movement of the expansion body relative to the anchor rod by a spindle drive that is formed by the corresponding threads. In particular, in the sleeve type of expansion anchor the anchor body, which may also have a multipart design, may extend to the mouth of the borehole.

BRIEF DESCRIPTION OF THE DRAWINGS

The present invention is explained in greater detail below with reference to preferred exemplary embodiments that are schematically illustrated in the appended figures; within the scope of the present invention, individual features of the exemplary embodiments described below may in principle be implemented alone or in any arbitrary combination.

FIG. 1 shows a partial longitudinal sectional view of an expansion anchor according to the present invention that is set in a concrete substrate, according to a first specific embodiment;

FIG. 2 shows a detailed view of the expansion anchor from FIG. 1;

FIG. 3 shows a partial longitudinal sectional view of the bolt of an expansion anchor in a modification of the specific embodiment in FIGS. 1 and 2;

FIG. 4 shows a partial longitudinal sectional view of an expansion anchor according to the present invention that is set in a concrete substrate, according to another specific embodiment; and FIG. 5 shows a detailed view of the expansion anchor from FIG. 4.

Identical or functionally equivalent elements are denoted by the same reference numerals in the figures.

DETAILED DESCRIPTION

FIGS. 1 and 2 show a first exemplary embodiment of an expansion anchor according to the present invention. As shown in particular in FIG. 1, the expansion anchor includes a bolt 10 and a anchor body 20, designed as an expansion sleeve, which encloses bolt 10. Bolt 10 includes a neck area 11 having a constant cross section, and, adjoining neck area 11 in the front end area of bolt 10, includes an expansion body 12, designed as an expansion cone, for anchor body 20, at which the surface is designed as an inclined surface 13. Inclined surface 13 has a rotationally symmetrical design here. Due to inclined surface 13, bolt 10 widens at expansion body 12, starting from neck area 11 toward the front end of the bolt. On the side of neck area 11 facing away from expansion body 12, bolt 10 includes a stop 17, designed as a ring shoulder, for example, for anchor body 20, which is designed as an expansion sleeve. At its rear end area facing opposite from expansion body 12, bolt 10 is provided with an external thread 18 for a nut 8.

During setting of the expansion anchor, bolt 10 together with expansion body 12 is pushed forward into a borehole in substrate 5 from FIG. 1 in the direction opposite extraction direction 101, in parallel to longitudinal axis 100 of bolt 10. Due to stop 17, anchor body 20 which is designed as an expansion sleeve is also introduced into the borehole. Bolt 10 is then pulled slightly farther out of the borehole in extraction direction 101 in parallel to longitudinal axis 100, for example by tightening nut 8. Due to its friction with the borehole wall, anchor body 20 which is designed as an expansion sleeve remains behind, resulting in a displacement of bolt 10 relative to anchor body 20. During this displacement, expansion body 12 of bolt 10 penetrates increasingly more deeply into the anchor body 20 in such a way that anchor body 20 is radially widened by expansion body 12 and is pressed against the wall of the borehole. The expansion anchor is fixed in substrate 5 as a result of this mechanism. The set state of the expansion anchor, in which it is fixed in substrate 5, is shown in FIG. 1. A mounting part 6 may be fixed to the substrate 5 with the aid of nut 8.

As is particularly apparent in FIG. 2, expansion body 12 has a double coating made up of an inner layer 61 and an outer layer 62 in an area of contact with anchor body 20 formed on its inclined surface 13, inner layer 61 being situated between outer layer 62 and expansion body 12 which has the two layers 61, 62, in particular in an integrally joined manner. The coefficient of friction, in particular static coefficient of friction, $\mu_2$ of outer layer 62 with respect to adjoining anchor body 20 is greater than the coefficient of friction, in particular static coefficient of friction, $\mu_1$ of inner layer 61 with respect to adjoining anchor body 20; i.e., $\mu_2 > \mu_1$. In a simple static load situation, bolt 10 together with expansion body 12 rubs against outer layer 62 on anchor body 20, so that comparatively high coefficient of friction $\mu_2$ acts, and high static extraction loads may thus be achieved. In contrast, in a dynamic load situation, outer layer 62 of bolt 10 may be rubbed off. From this point on, expansion body 12 then rubs against inner layer 61 on anchor body 20, so that now, comparatively low coefficient of friction $\mu_1$ acts, and effective sliding of expansion body 12 back and forth in anchor body 20 is made possible.

The double coating, made up of layers 61 and 62, on expansion body 12 has been described in the exemplary embodiment in FIGS. 1 and 2. As shown in FIG. 3, however, the double coating having layers 61 and 62, schematically illustrated with dashed lines in greatly enlarged form in FIG. 3, may additionally extend onto neck area 11.

The expansion anchor in the exemplary embodiments in FIGS. 1 through 3 is a so-called bolt type. Another exemplary embodiment, in which the expansion anchor is designed as a so-called sleeve type, is shown in FIGS. 4 and 5. In contrast to the expansion anchors from FIGS. 1 through 3, in which expansion body 12 is axially fixedly fastened to the remainder of bolt 10 and in particular is designed in one piece with the remainder of bolt 10, bolt 10 in the exemplary embodiment in FIGS. 4 and 5 includes an anchor rod 15 that is separate from expansion body 12; i.e., anchor rod 15 and expansion body 12 are two separate parts. Expansion body 12 with inclined surface 13 has an internal thread that corresponds to an external thread on anchor rod 15 of bolt 10. In addition, in the expansion anchor in FIGS. 4 and 5, anchor body 20, which is designed as an expansion sleeve and which may also have a multipart design, extends to the mouth of the borehole, and a widened head 88 is rotatably fixedly situated on anchor rod 15 at the rear end area of bolt 10.

For setting the expansion anchor in FIGS. 4 and 5, anchor rod 15 is set in rotation about longitudinal axis 100, preferably via head 88. The corresponding threads convert this rotational movement of anchor rod 15 into an axial movement of expansion body 12 relative to anchor rod 15 and thus relative to anchor body 20, resulting in retraction of expansion body 12 with inclined surface 13 into anchor body 20.

Also in the expansion anchor in FIGS. 4 and 5, in an area of contact with anchor body 20 formed on inclined surface 13, expansion body 12 of bolt 10 has a double coating made up of an inner layer 61 and an outer layer 62, coefficient of friction $\mu_2$ of outer layer 62 with respect to adjoining anchor body 20 being greater than coefficient of friction $\mu_1$ of inner layer 61 with respect to adjoining anchor body 20; i.e., $\mu_2 > \mu_1$, so that particularly good static and dynamic properties may also be achieved in this way.

What is claimed is:

1. An expansion anchor comprising:
    at least one anchor body as a first element; and
    at least one bolt as a second element, the bolt including an expansion body pushing the anchor body radially outwardly when the expansion body is moved in an extraction direction relative to the anchor body;
    a double coating having an inner layer and an outer layer covering the inner layer is provided on one of the first and second elements in an area of contact with the other of the first and second elements, the outer layer having a coefficient of friction ($\mu_2$) with respect to the other element greater than a coefficient of friction ($\mu_1$) of the inner layer with respect to the other element.

2. The expansion anchor as recited in claim 1 wherein the coefficient of friction ($\mu_2$) of the outer layer with respect to the other element is at least 20%, 50%, or 100% greater than the coefficient of friction ($\mu_1$) of the inner layer with respect to the other element.

3. The expansion anchor as recited in claim 2 wherein the coefficient of friction ($\mu_2$) of the outer layer with respect to the other element is at least 50% greater than the coefficient of friction ($\mu_1$) of the inner layer with respect to the other element.

4. The expansion anchor as recited in claim 3 wherein the coefficient of friction ($\mu_2$) of the outer layer with respect to the other element is at least 100% greater than the coefficient of friction ($\mu_1$) of the inner layer (61) with respect to the other element.

5. The expansion anchor as recited in claim 1 wherein the double coating is provided at least on the expansion body.

6. The expansion anchor as recited in claim 1 wherein the anchor body is an expansion sleeve enclosing the bolt at least in areas, and the expansion body is an expansion cone.

7. The expansion anchor as recited in claim 1 wherein the expansion anchor is an expansion anchor of the bolt type.

* * * * *